(12) United States Patent
Dutta et al.

(10) Patent No.: US 12,314,581 B2
(45) Date of Patent: May 27, 2025

(54) STORAGE SYSTEM SELECTION FOR STORAGE VOLUME DEPLOYMENT

(71) Applicant: HEWLETT PACKARD ENTERPRISE DEVELOPMENT LP, Houston, TX (US)

(72) Inventors: Mayukh Dutta, Karnataka (IN); Aesha Dhar Roy, Karnataka (IN); Manoj Srivatsav, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 545 days.

(21) Appl. No.: 17/650,426

(22) Filed: Feb. 9, 2022

(65) Prior Publication Data
US 2023/0251785 A1    Aug. 10, 2023

(51) Int. Cl.
    *G06F 3/06*      (2006.01)
    *G06F 9/50*      (2006.01)

(52) U.S. Cl.
    CPC .......... *G06F 3/0631* (2013.01); *G06F 3/0604* (2013.01); *G06F 3/0683* (2013.01); *G06F 9/5011* (2013.01); *G06F 2209/5019* (2013.01)

(58) Field of Classification Search
None
See application file for complete search history.

(56) References Cited

U.S. PATENT DOCUMENTS

| | | | |
|---|---|---|---|
| 8,595,515 B1 | 11/2013 | Weber et al. | |
| 9,477,431 B1 | 10/2016 | Chen et al. | |
| 9,864,749 B2 | 1/2018 | Basak et al. | |
| 9,875,169 B2 | 1/2018 | Ashby, Jr. et al. | |
| 10,469,582 B2 | 11/2019 | Dimnaku et al. | |
| 10,528,115 B2 | 1/2020 | Deng et al. | |
| 2002/0019873 A1 | 2/2002 | Goldszmidt et al. | |
| 2009/0276203 A1* | 11/2009 | Everhart | G06F 11/3457 703/21 |

(Continued)

OTHER PUBLICATIONS

Anshul Madan, "Optimal workload placement using the AI-driven HPE InfoSight Resource Planner", Hewlett Packard Enterprise Community, available online at <https://community.hpe.com/t5/Around-the-Storage-Block/Optimal-workload-placement-using-the-AI-driven-HPE-InfoSight/ba-p/7151240#.YrndxnbMKPo>, Oct. 15, 2021, 6 pages.

Jenna Colleran, "Reimagine storage provisioning: Intent-based provisioning with Data Services Cloud Console", Hewlett Packard Enterprise Community, available online at <https://community.hpe.com/t5/blogs/blogarticleprintpage/blog-id/AroundthestorageBlock/article-id/4520>, Aug. 5, 2021, 3 pages.

(Continued)

*Primary Examiner* — Lewis A Bullock, Jr.
*Assistant Examiner* — Jordan Scott Motter
(74) *Attorney, Agent, or Firm* — Trop, Pruner & Hu, P.C.

(57) ABSTRACT

In some examples, a system receives input information of characteristics relating to a storage volume to be provisioned in a collection of storage systems, determines, based on the input information of the characteristics relating to the storage volume, a workload profile, and simulates execution of a workload according to the workload profile in each storage system of the collection of storage systems. Based on the simulation, the system determines a respective amount of headroom used by the workload in each storage system of the collection of storage systems, and selects, based on the determined respective amounts of headroom used by the workload in respective storage systems of the collection of storage systems, a storage system from the collection of storage systems on which the storage volume is to be provisioned.

16 Claims, 4 Drawing Sheets

(56) References Cited

U.S. PATENT DOCUMENTS

| | | | | |
|---|---|---|---|---|
| 2010/0082700 | A1* | 4/2010 | Parab | G06F 16/1748 |
| | | | | 711/E12.002 |
| 2014/0201435 | A1* | 7/2014 | Dong | G06F 13/1694 |
| | | | | 711/158 |
| 2015/0066470 | A1* | 3/2015 | Chopra | G06F 3/0653 |
| | | | | 703/20 |
| 2015/0220438 | A1 | 8/2015 | Chakalian et al. | |
| 2015/0378604 | A1* | 12/2015 | Kawakami | G06F 13/4022 |
| | | | | 710/5 |
| 2016/0191322 | A1* | 6/2016 | Bita | G06F 3/0659 |
| | | | | 709/226 |
| 2016/0366223 | A1* | 12/2016 | Mason | G06F 9/5072 |
| 2018/0027060 | A1* | 1/2018 | Metsch | H04L 49/357 |
| 2019/0179679 | A1 | 6/2019 | Dimnaku et al. | |
| 2020/0167199 | A1 | 5/2020 | Zur et al. | |

OTHER PUBLICATIONS

HPE Technology, Excerpt from video "Unleash the Power of Data," May 4, 2021, excerpt time: 10:31-17:10, <https://www.youtube.com/watch?v=iGz09Rqpabc>.

Amazon Web Services, Inc., "Amazon RDS DB instance storage," Jan. 26, 2022, <https://web.archive.org/web/20220126095549/https://docs.aws.amazon.com/AmazonRDS/latest/UserGuide/CHAP_Storage.html>, 7 pages.

Boyan Ivanov, "Storage sizing and I/O density", available online at <https://storpool.com/blog/storage-sizing-io-density>, Apr. 10, 2017, 4 pages.

* cited by examiner

STORAGE SYSTEM SELECTION FOR STORAGE VOLUME DEPLOYMENT

BACKGROUND

An enterprise (e.g., a business organization, a government agency, an educational organization, an individual, or any other type of organization, or any combination of one or more of each of the foregoing) can maintain storage systems on which storage volumes can be deployed. The storage systems may be used by users of the enterprise, whether internal users or external users. For example, the storage systems may be part of a data center. Alternatively, the storage systems may be accessible in a cloud.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A collection of storage systems maintained by an enterprise can include storage systems with different features. For example, storage systems may use different types of storage devices, where some storage systems can employ disk-based storage devices, while other storage systems can employ solid-state drives. In further examples, different storage systems can employ different data reduction techniques, which can include any or some combination of data compression, data deduplication, and so forth. As further examples, storage systems can implement different security features. As other examples, storage systems can have different storage capacities, with some storage systems having higher storage capacities than other storage systems. A storage capacity of a storage system refers to an amount of data that the storage system can store. In yet further examples, different storage systems can execute different operating systems.

A collection of storage systems with different features can be referred to as a heterogeneous collection of storage systems. In other examples, a collection of storage systems can have the same features, in which case this collection of storage systems can be referred to as a homogeneous collection of storage systems.

A "storage system" can refer to a physical arrangement of resources (including storage resources, processing resources, and communication resources) for storing data and managing requests to access (read or write) data stored in the storage system.

In some examples, logical partitions of storage of data, referred to as storage volumes, can also be defined in storage systems. A storage volume can refer to a logical unit of storage. A storage volume can have a specified storage capacity, and requesters can access data in the storage volume. A physical storage system can include a single storage volume or multiple storage volumes.

An entity (such as a user, a program, or a machine) can request that a storage volume (or multiple storage volumes) be provisioned in a storage system. "Provisioning" a storage volume in a storage system can refer to creating the storage volume and configuring the storage volume such that the storage volume is ready to store data and to receive requests to access data.

A challenge exists in deciding which storage system from a collection of storage systems a given storage volume is to be provisioned on. The challenge of selecting a storage system from a collection of storage systems is made more complicated if the collection of storage systems is a heterogeneous collection of storage systems in which the storage systems may have features that differ from one another. Also, some storage systems may be more loaded than other storage systems, which can impact the selection of a storage system on which a storage volume is to be provisioned.

In some cases, a user may be asked to provide specific information about characteristics of a workload expected for a storage volume in deciding which storage system of a collection of storage systems would be optimal for the storage volume. A "workload" for a storage volume can refer to activities, including input/output (I/O) operations and other activities, that are to be performed with respect to the storage volume once provisioned in a storage system. However, the user may have no knowledge of the expected workload characteristics, such as I/O operations per second (IOPS), read/write ratios, I/O sizes, and so forth.

IOPS refers to a quantity of I/O operations per second that the workload is expected to perform. A read/write ratio represents the ratio between read operations and write operations in the workload. An I/O size can refer to a size of data involved in an I/O operation. For example, an I/O size can refer to a read size, which is the size of data (e.g., average size, maximum size, minimum size, etc.) in a read operation. As another example, the I/O size can be a write size, which is the size of data in a write operation.

If the user is unable to provide specific information about workload characteristics for a storage volume to be deployed, then some example provisioning systems may not be able to select an appropriate storage system from a collection of storage systems for provisioning the storage volume.

In accordance with some implementations of the present disclosure, to provision storage volumes in a collection of storage systems, simple inputs regarding storage volumes are received by an intent-based provisioning system from requesting entities (e.g., users, programs, and/or machines). Examples of the simple inputs are discussed further below.

The simple inputs refer to general characteristics of an expected workload for a storage volume, and represents an "intent" of the storage volume workload. The intent-based provisioning system receives the "intent" (i.e., as represented by the simple inputs), and infers a workload profile from the simple inputs. The workload profile contains characteristics of the expected workload for the storage volume.

The intent-based provisioning system can simulate an execution of a workload having the workload profile in respective storage systems of the collection of storage systems. Based on the simulations, respective headrooms used by the workload in each storage system are determined, and based on the determined headrooms, a storage system (or multiple storage systems) can be selected for provisioning the storage volume.

A "headroom" of a storage system is a measure that represents how much more workloads the storage system can receive without a deterioration in the performance of the storage system, or more specifically, without causing performance of the storage system to drop below a specific threshold, as expressed by one or more performance parameters, such as any or some combination of the following: throughput of the storage system, latency of the storage system, saturation of the storage system, processor busy, storage device busy, and so forth. The headroom of the storage system can be computed based on any or some combination of the foregoing performance parameters. For example, if the maximum throughput of the storage system is X (which can be based on a specification of the storage system or based on prior tests of the storage system, and the current throughput of the storage system (due to current workloads executing on the storage system) is Y, then the headroom is X-Y, or possibly X-Y-B, where B represents a buffer to avoid having the storage system being run at its maximum throughput. In other examples, similar computations of headroom can be computed based on a combination of different performance parameters.

If different storage systems use different measures of headrooms, then normalization can be applied to normalize the different measures to produce normalized measures that can be intelligently compared by the intent-based storage system for selecting a storage system to provision a storage volume.

For example, the headroom of a storage system can be expressed using discrete values, such as "high headroom," "medium headroom," or "low headroom." In other examples, the headroom can be expressed using a numeric value.

Figure 1:
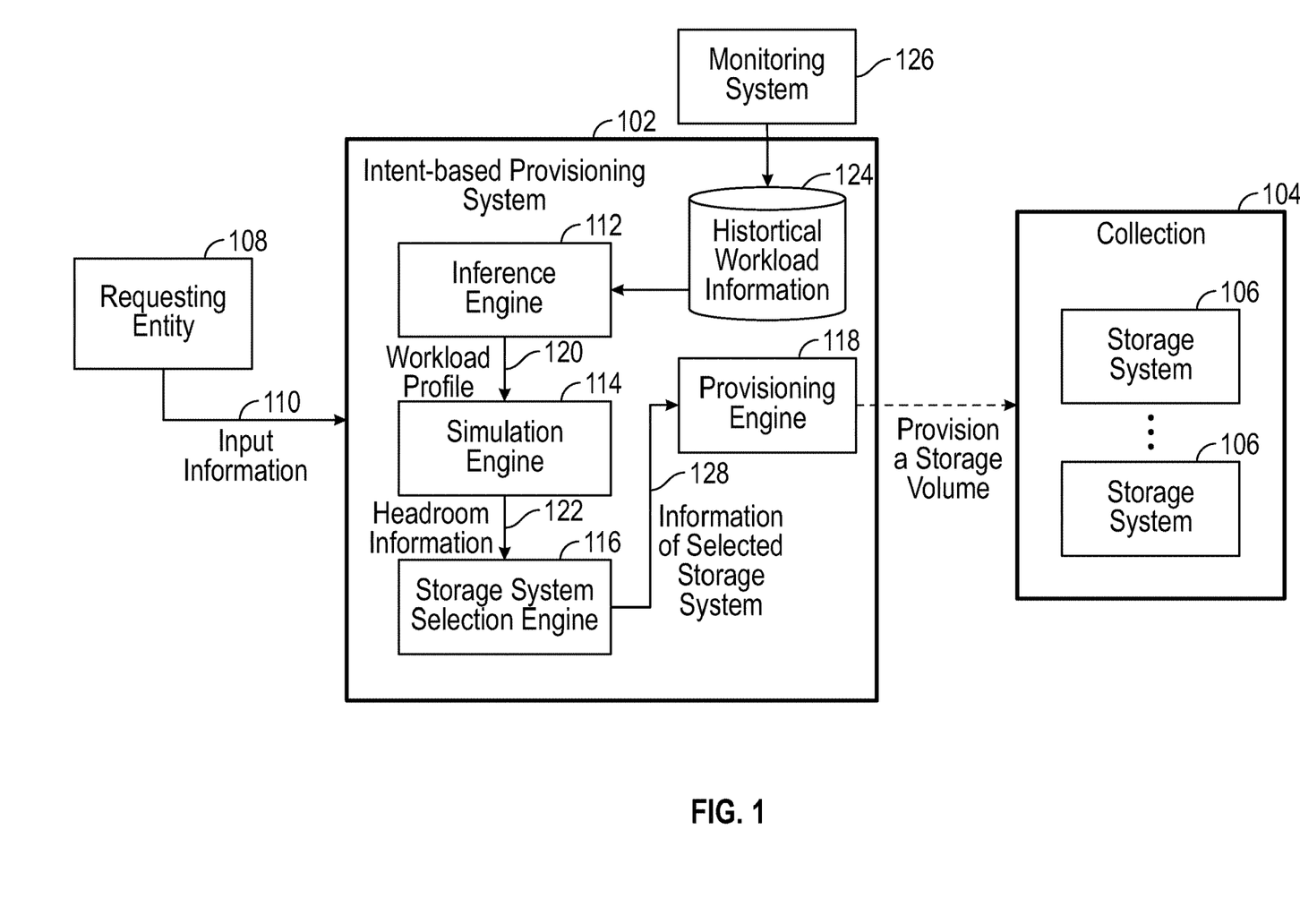
FIG. 1 is a block diagram of an arrangement that includes an intent-based provisioning system to provision the storage volumes on selected storage systems, according to some examples.

FIG. 1 is a block diagram of an example arrangement that includes an intent-based provisioning system 102 to provision storage volumes on respective storage systems 106 of a collection 104 of storage systems.

A requesting entity 108 can send input information 110 to the intent-based provisioning system 102, where the input information 110 relates to a characteristic (or multiple characteristics) of workload(s) for one or more storage volumes to be provisioned in storage system(s) 106 of the collection 104 of storage systems. The requesting entity 108 can be a user, a program, or a machine. A user can use a user device to submit the input information 110. The user device can be in the form of a desktop computer, a notebook computer, a tablet computer, a smartphone, or any other type of user device. A program can execute in a computer to submit the input information 110. The machine can be a computer or any other type of machine.

In some examples, a user device can present a user interface (UI), such as a web-based UI provided by the intent-based provisioning system 102 and presentable at the user device. The UI can include various input fields to allow the user to enter the input information 110, such as in text boxes, dropdown menus, and so forth.

In some examples, the requesting entity 108 can communicate with the intent-based provisioning system 102 over a network, such as a local area network (LAN), a wide area network (WAN), a public network (e.g., the Internet), and so forth.

The intent-based provisioning system 102 can include a web-based system (e.g., including a web server or multiple web servers), a cloud-based system (in which components of the intent-based provisioning system 102 reside in a cloud), or any other type of system.

In response to the input information 110, the intent-based provisioning system 102 can make a determination of which of the multiple storage systems 106 in the collection 104 a given storage volume is to be provisioned on. The intent-based provisioning system 102 includes an inference engine 112, a simulation engine 114, a storage system selection engine 116, and a provisioning engine 118. The functionalities of each of the engines 112, 114, 116, and 118 are discussed further below.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The input information 110 supplied by the requesting entity 108 can include the following information: an application type and a size of a storage volume. For example, the application type can refer to a type of application associated with data stored in the storage volume. A database program from a specific vendor is a first application type; in other words, the database program from the specific vendor is used to read and write data in the storage volume. As other examples, the application type can refer to a type of data that is to be stored in the storage volume, for example, a first application type relates to storing a database log, a second application type relates to storing data according to a specific format, and so forth. In further examples, another application type can relate to use of virtual servers or virtual machines in storing data in a storage volume.

The size of a storage volume can refer to the amount of data that the storage volume can store. In some examples, the size of the storage volume can refer to the maximum storage capacity of the storage volume. In other examples, the size of the storage volume can refer to a target amount of data expected to be stored.

In some examples, there is a monotonic relationship between an I/O pattern for a given application type and a size of the storage volume that a workload having the I/O pattern is run on. An I/O pattern is represented by a workload profile. The significance of the monotonic relationship between the I/O pattern for the given application type and the size of the storage volume is that as the size of the storage volume increases, the workload of the given application type running on the storage volume also increases proportionally.

In addition to the foregoing examples of input information 110, in further examples, additional input information 110 can be provided. For example, the input information 110 can further include a parameter that represents a quantity of storage volumes (of the respective application type and storage volume size) to be provisioned, where the "quantity" can be 1 or more than 1.

As another example, the input information 110 can further indicate whether or not a type of data reduction is to be applied to data stored in the storage volume, where the data reduction can include data compression and/or data deduplication. For example, a data reduction parameter in the input information 110 can have a first value to specify no data reduction is applied, a second value to specify data compression is applied, a third value to specify data deduplication is applied, and a fourth value to specify both data compression and data deduplication is applied.

The input information 110 is received by the inference engine 112 of the intent-based provisioning system 102. The inference engine 112 generates, based on the input information 110 such as the application type and the storage volume size, a workload profile 120 that includes one or more characteristics of a workload to be performed with respect to the storage volume that is to be provisioned. The workload profile can include any or some combination of the following information: a rate of I/O operations, which can be expressed as IOPS, a read/write ratio, an I/O size, and so forth. As noted above, the workload profile represents an I/O pattern of the workload for the storage volume.

Based on the intent expressed by the input information 110, the intent-based provisioning system 102 can recommend a selected placement of the storage volume in the collection 104 of storage systems.

By allowing the requesting entity 108 to supply relatively simple input information 110, the requesting entity 108 would not have to have detailed knowledge regarding the workload profile of a given storage volume to be provisioned. Instead, the intent-based provisioning system 102 can process the input information 110 to generate the workload profile 120 including more detailed information of the characteristics of the expected workload that can then be used as part of an intelligent selection of a storage system 106 on which the given storage volume is to be provisioned.

The inference engine 112 can infer the workload profile from the input information based on historical workload information 124 collected in storage systems that perform various different workloads relating to storage volumes in the storage systems. The historical workload information 124 can be collected for storage systems deployed at various different sites, such as at sites of different enterprises. A monitoring system 126 can track various characteristics of workloads executed in the storage systems, including application type, storage volume size, IOPS, read/write ratio, I/O size, and so forth. For example, the monitoring system 126 can be deployed by a vendor of storage systems that provides the storage systems to various customers. The vendor may have arrangements in place with the customers to monitor workloads executed on the customers' storage systems, such as for purposes of detecting faults, performance degradations, or other anomalies.

The tracked characteristics collected by the monitoring system 126 processed such that application types and storage volume sizes are correlated to other workload characteristics, such as IOPS, read/write ratio, I/O size, and so forth.

Figure 2:
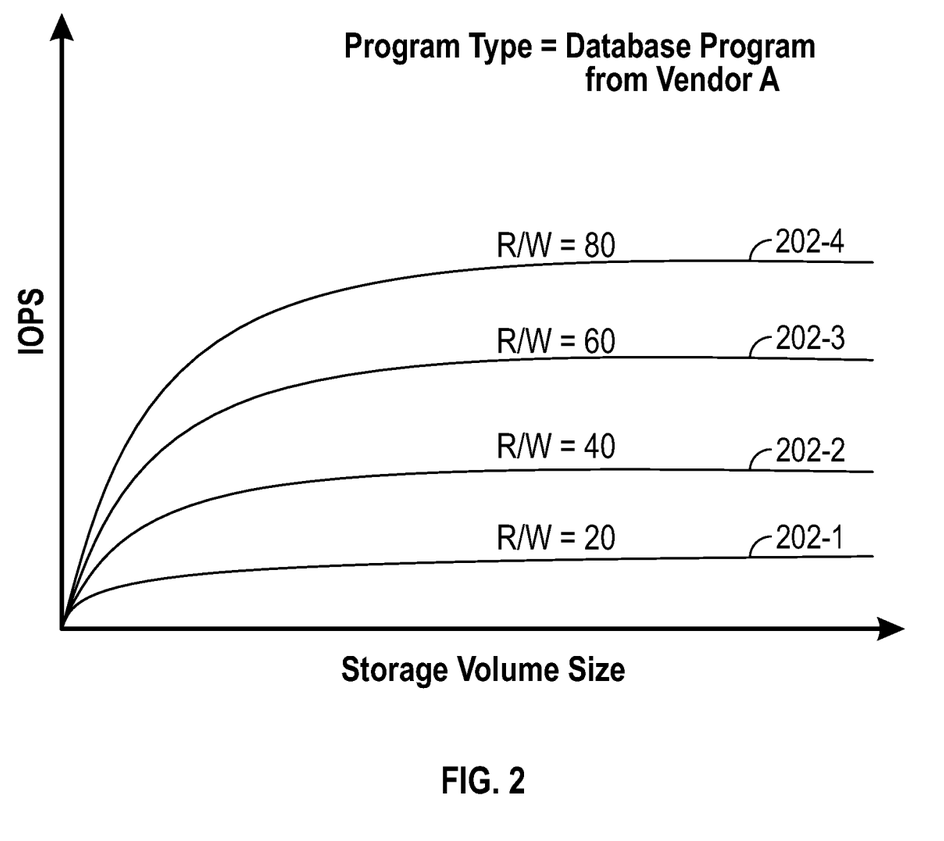
FIG. 2 is a graph showing curves depicting relationships between storage volume size and input/output (I/O) operations per second, according to some examples.

FIG. 2 is a graph that shows four curves 202-1, 202-2, 202-3, and 202-4 representing relationships between storage volume size (horizontal axis) and IOPS (vertical axis), where the curves 202-1, 202-2, 202-3, and 202-4 are based on data in the historical workload information 124 collected for an application type that includes database program from vendor A. The curve 202-1 depicts a relationship between storage volume size and IOPS in examples where the read/write ratio is 20, the curve 202-2 depicts a relationship between storage volume size and IOPS in examples where the read/write ratio is 40, the curve 202-3 depicts a relationship between storage volume size and IOPS in examples where the read/write ratio is 60, and the curve 202-4 depicts a relationship between storage volume size and IOPS in examples where the read/write ratio is 80.

Note that other curves not shown can represent data for other application types.

Thus, if the input information 110 specifies the application type includes a database program from vendor A and storage volume size of Z, then corresponding IOPS values can be obtained from the curves 202-1, 202-2, 202-3, and 202-4 for the four different read/write ratios.

From the historical workload information 124, workload characteristics can be derived as depicted in Table 1 below.

TABLE 1

| Application Type | SV Size | RW_ratio | Read Size | Write Size | Read IOPS | Write IOPS | Weight |
|---|---|---|---|---|---|---|---|
| DB Vendor A | 2 Mb | 20 | 254 | 196 | 14 | 215 | 0.35 |
| DB Vendor A | 2 Mb | 40 | 512 | 369 | 161 | 207 | 0.16 |
| DB Vendor A | 2 Mb | 60 | 609 | 634 | 250 | 109 | 0.13 |
| DB Vendor A | 2 Mb | 80 | 729 | 141 | 1131 | 38 | 0.36 |

In Table 1, the input information 110 (including application type and storage volume (SV) size) is correlated to the following characteristics: read/write ratio (RW_ratio), read size, write size, read IOPS, and write IOPS.

In the example of Table 1, the workload profile 120 inferred by the inference engine 112 based on the historical workload information 124 can include four sets of workload characteristics, where each set corresponds to a respective different read/write ratio. In the example of Table 1, a first set of workload characteristics is in the first row of Table 1 for the read/write ratio of 20, a second set of workload characteristics is in the second row of Table 1 for the read/write ratio of 40, a third set of workload characteristics is in the third row of Table 1 for the read/write ratio of 60, and a fourth set of workload characteristics is in the fourth row of Table 1 for the read/write ratio of 80.

In further examples, additional input information (e.g., a quantity of storage volumes and/or a data reduction technique used) can be correlated with respective sets of workload characteristics in a table similar to Table 1.

The last column of Table 1 has a Weight value. The Weight value is based on a percentage of I/O operations from among the total I/O operations that have the respective set of workload characteristics. For example, in Table 1, 35% of I/O operations have the first set of workload characteristics, 16% of I/O operations have the second set of workload characteristics, 13% of I/O operations have the third set of workload characteristics, and 36% of I/O operations have the fourth set of workload characteristics.

The inference engine 112 provides the workload profile 120 to the simulation engine 114. The simulation engine 114 uses the workload profile 120 to simulate workload(s) according to the workload profile 120 on each storage system 106 of the collection 104 of storage systems.

A workload according to a workload profile can refer to a workload with I/O operations performed with respect to a storage volume that have characteristics represented by at least a subset of the workload profile.

In the example where the workload profile 120 includes four sets of workload characteristics as noted above, the simulation engine 114 can simulate the execution of four respective workloads according to the four sets of workload characteristics on each storage system 106. For example, the simulation engine 114 can simulate the execution of a first workload according to the first set of workload characteristics on each storage system 106, the execution of a second workload according to the second set of workload characteristics on each storage system 106, the execution of a third workload according to the third set of workload characteristics on each storage system 106, and the execution of a fourth workload according to the fourth set of workload characteristics on each storage system 106.

The simulation of the execution of a workload on a storage system 106 allows the simulation engine 114 to determine an amount of additional headroom of the storage system 106 used by the workload. In some examples, the simulation engine 114 can include a Storage Sizer (also referred to as a Performance Estimation Module) from Hewlett-Packard Enterprise (HPE). The Storage Sizer from HPE is a sizing tool to help design a storage infrastructure. The input to the Storage Sizer can be the workload profile 120. The Storage Sizer receives as input the workload profile for the workload to be simulated, which includes I/O size information (e.g., read and write sizes as shown in Table 1 above) as well as other information in the workload profile. The Storage Sizer also receives as input a storage system configuration of the storage system 106, where the storage configuration can include a current headroom of the storage system, storage capacity of storage device(s) in the storage system 106, and so forth. The Storage Sizer responds to the inputs with a maximum IOPS value that the workload according to the workload profile can possibly do on the storage system 106 without introducing performance degradation on storage system 106. This maximum IOPS value is referred to as Perf IOPS in Eq. 3 below.

It is noted that each storage system 106 in the collection 104 of storage systems may already be executing current workloads for existing storage volumes on the storage system 106. Thus, any additional headroom used by the simulated workload would be on top of the headroom consumed by any existing workloads on the storage system 106.

The simulation engine 114 is able to determine a current available headroom on each storage system 106 in the collection 104. The simulation engine 114 can make this determination based on information already collected regarding the current headroom available in the storage system 106, such as in the historical workload information 124.

Once the simulation engine 114 has determined the current available headroom of each storage system 106 in the collection 104 of storage systems, the simulation engine 114 can simulate execution of the workload(s) according to the workload profile 120 on each storage system 106.

The simulation performed by the simulation engine 114 determines the additional headroom usage added by the simulated workload that corresponds to the storage volume to be provisioned. The additional headroom usage by the simulated workload is added to the headroom used by existing workloads on the storage system 106 to derive a total headroom used by the existing workloads and the simulated workload, so that the simulation engine 114 can determine the available headroom if the storage volume were to be deployed on the storage system 106.

As noted above, the headroom of a storage system is a measure that represents how much more workloads the storage system can receive without a deterioration in the performance of the storage system, or more specifically, without causing performance of the storage system to drop below a specific threshold.

As an example, if there are two storage systems 1 and 2 with the same current headroom (based on existing workloads on storage systems 1 and 2), then the simulation performed by the simulation engine 114 can calculate additional headroom usage by the simulated workload on each of storage systems 1 and 2. The additional headroom usages on storage systems 1 and 2 are added to the current headroom to derive the total available headrooms on the respective storage systems 1 and 2. The total available headrooms of storage systems 1 and 2 can be compared to determine which storage system would have greater available headroom after provisioning of the storage volume on the storage system. The storage system with the greater available headroom after deployment of the storage volume onto the storage system can be selected as the candidate for provisioning the storage volume.

More generally, it can be assumed that the simulation engine 114 has determined that storage systems 106 have corresponding current headrooms usages represented as CH_1, CH_2, . . . , CH_N, where N≥2. The current headroom usage CH_i (i=1 to N) represents the current headroom in storage system i used by existing workload(s).

The simulation engine 114 then simulates execution of the workload(s) according to the workload profile 120 on each of the storage systems 106, and determines the additional headroom usage on the respective storage system 106. The additional headroom usages on the N storage systems are represented as AH_1, AH_2, . . . , AH_N.

Then the total available headroom used for each storage system i is represented as $$TH\_i = CH\_i + AH\_i. \quad \text{(Eq. 1)}$$

The total headroom available can then be computed as:

$$THA\_i = 100 - TH\_i \text{ or } 100 - (CH\_i + AH\_i), \quad \text{(Eq. 2)}$$

where the value 100 assumes that 100 is the maximum available headroom in examples where headroom is expressed as a percentage.

The additional headroom usage AH_i can be computed using the following equation, in some examples:

$$AH\_i\_j = \left(\frac{\text{Read } IOPS}{\text{Perf } IOPS + \text{Read size ratio}}\right) + \left(\frac{\text{Write } IOPS}{\text{Perf } IOPS + \text{Write size ratio}}\right) * 100. \quad \text{(Eq. 3)}$$

AH_i_j represents the additional headroom usage by workload j on storage system i. If there are four workloads simulated on storage system i, then the following values are calculated: AH_i_1, AH_i_2, AH_i_3, and AH_i_4, for workloads 1, 2, 3, and 4, respectively. The four workloads can be according to the four sets of workload characteristics depicted in Table 1, for example.

In Eq. 3, Read IOPS and Write IOPS are taken from the respective row of Table 1. The parameter Perf IOPS represents the maximum IOPS a storage system can execute before the storage system starts seeing latency impacts (e.g., latency increases exponentially beyond this). The value of Perf IOPS can be based on observations of existing storage systems.

In Eq. 3, the parameter Read size ratio is the ratio of the maximum block size to the Read size value from the respective row of Table 1. The maximum block size is the maximum size of a block that can be read or written. As used here, a "block" can refer to any unit of data that can be read or written. The parameter Write size ratio is the ratio of the maximum block size to the Write size value from the respective row of Table 1.

Although specific equations are provided to compute the additional workload usage, it is noted that the additional workload usage can be computed in other ways in other examples.

In examples where multiple workloads are simulated on storage system i, then AH_i is computed as:

$$AH\_i = \Sigma_{j=1}^{M} AH\_i\_j, \quad (Eq. 4)$$

where M represents the quantity of workloads simulated.

In further examples, AH_i can be computed based on a weighted sum of the AH_i_j values, as follows:

$$AH\_i = \Sigma_{j=1}^{M} w_j \cdot AH\_i\_j, \quad (Eq. 5)$$

where $w_j$ is the weight value in Table 1.

The simulation engine 114 provides headroom information 122 to the storage system selection engine 116. The headroom information 122 can include the current headroom usage CH_i of each storage system i and the additional headroom usage AH_i of the storage system i. Alternatively, the headroom information 122 can include the total available headroom THA_i of each storage system i.

The storage system selection engine 116 compares the total available headrooms of the corresponding storage systems 106 (after adding the additional workload for the storage volume to be deployed). In some examples, the storage system selection engine 116 can select the storage system 106 with the highest headroom, based on comparing THA_1, THA_2, . . . , THA_N; in other words, the storage system selection engine 116 can select the storage system with the highest total headroom THA_i.

The storage system selection engine 116 provides information of the selected storage system 128 to the provisioning engine 118. In response, the provisioning engine 118 provisions (at 130) the storage volume onto the selected storage system. The provisioning engine 118 can use any of various provisioning tools to provision a storage volume onto a storage system.

In other examples, the storage system selection engine 116 can also consider other factors, in addition to the total headroom of each storage system, in deciding which storage system the storage volume is to be provisioned on.

Other factors can include the capacities of the storage systems (e.g., storage capacities and/or processing capacities) and/or communication capabilities (e.g., communication speeds available for the storage systems) in deciding which storage system the storage volume is to be provisioned on. For example, the storage system selection engine 116 can perform a weighted summation of the various factors, including total headroom, capacity, and communication capability of each storage system to produce a respective measure that can then be compared with other corresponding measures to decide which storage system 106 to select for provisioning the storage volume.

The foregoing refers to examples in which the requesting entity 108 can supply whether or not a data reduction is applied, and the data reduction technique applied, as part of the input information 110 that can be used by the inference engine 112 to produce the workload profile 120.

In other examples, the data reduction information is not included as part of the input information 110. Instead, the simulation engine 114 can determine whether or not data reduction should be applied for the storage volume, and if so, the type of data reduction (e.g., data compression, data deduplication, etc.) applied. Based on the historical workload information 124, the simulation engine 114 can determine that the headroom used by a workload may be reduced if a data reduction technique were applied. In such a case, the simulation engine 114 can further supply a data reduction setting to the provisioning engine 118, which can provision the storage volume on the selected storage system with a data reduction technique enabled according to the data reduction setting.

Figure 3:
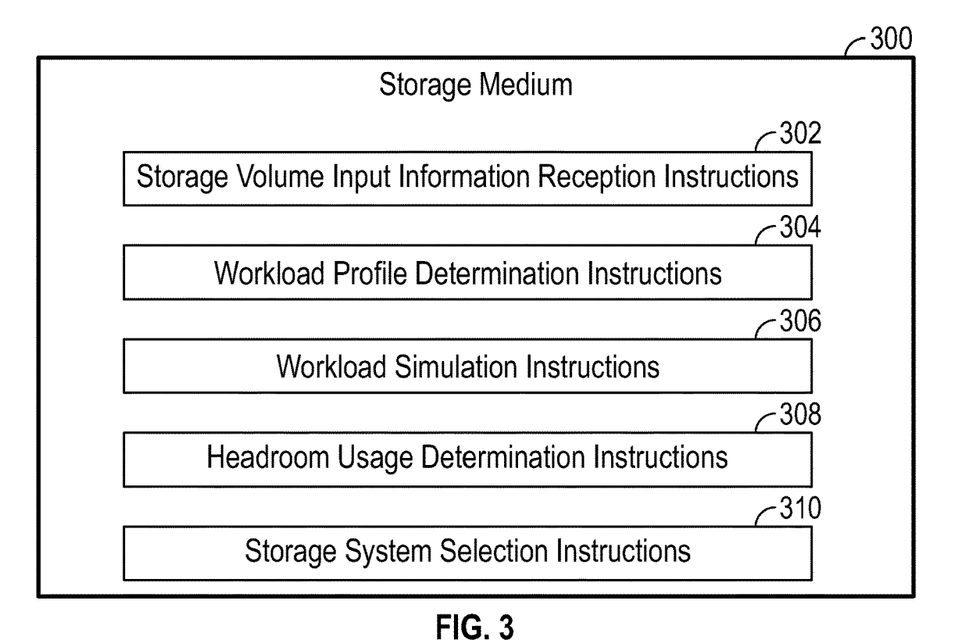
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The system can include a computer or multiple computers.

The machine-readable instructions include storage volume input information reception instructions 302 to receive input information of characteristics relating to a storage volume to be provisioned in a collection of storage systems. The input information includes an application type relating to data stored in the storage volume and a size of the storage volume. The input information can further include other information relating to the storage volume, such as a quantity of storage volumes of the application type and the size to be provisioned, or information specifying a data reduction technique to be applied for the storage volume, and so forth.

The machine-readable instructions include workload profile determination instructions 304 to determine, based on the input information of the characteristics relating to the storage volume, a workload profile. In some examples, the determination of the workload profile can be further based on historical workload information collected for storage systems. In some examples, the machine-readable instructions can correlate the application type and the size of the storage volume to respective workload characteristics in the historical workload information, and can include the respective workload characteristics in the workload profile.

The machine-readable instructions include workload simulation instructions 306 to simulate execution of a workload according to the workload profile in each storage system of the collection of storage systems. In some examples, the workload profile includes any or a combination of a ratio between read operations and write operations, an I/O size, and a rate of I/O operations.

The machine-readable instructions include headroom usage determination instructions 308 to, based on the simulation, determine a respective amount of headroom used by the workload in each storage system of the collection of storage systems.

The machine-readable instructions include storage system selection instructions 310 to select, based on the determined respective amounts of headroom used by the workload in respective storage systems of the collection of storage systems, a storage system from the collection of storage systems on which the storage volume is to be provisioned.

In some examples, the machine-readable instructions can determine a current headroom of each storage system of the collection of storage systems. Selecting of the storage system from the collection of storage systems can be further based on the current headroom of each storage system of the collection of storage systems.

In some examples, the machine-readable instructions can determine whether a data reduction is to be applied for the storage volume, and provision the storage volume on the selected storage system according to the determination of whether the data reduction is to be applied.

Figure 4:
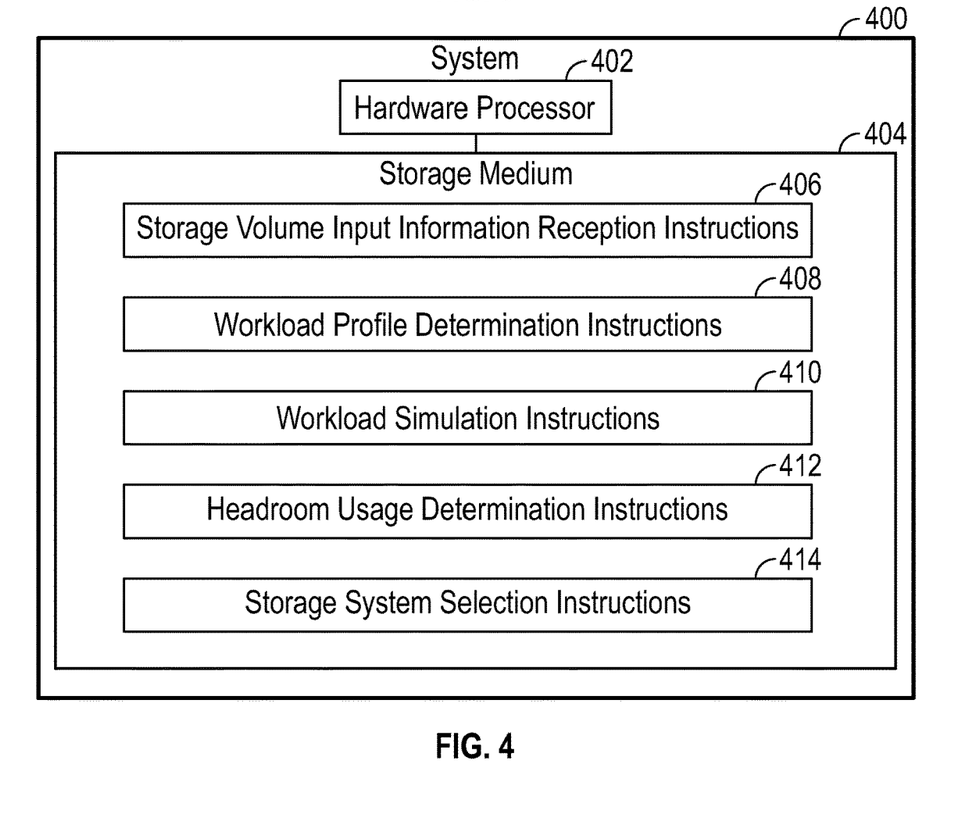
FIG. 4 is a block diagram of a system according to some examples.

FIG. 4 is a block diagram of an example system 400 according to some implementations of the present disclosure. The system 400 includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The system 400 includes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions in the storage medium 404 include storage volume input information reception instructions 406 to receive input information of characteristics relating to a storage volume to be provisioned in a collection of storage systems, where the input information includes an application type relating to data stored in the storage volume and a size of the storage volume.

The machine-readable instructions in the storage medium 404 include workload profile determination instructions 408 to determine, based on the input information and on collected information for storage systems on which workloads are run, a workload profile that includes workload characteristics for a workload relating to the storage volume.

The machine-readable instructions in the storage medium 404 include workload simulation instructions 410 to simulate execution of the workload according to the workload profile in each storage system of the collection of storage systems.

The machine-readable instructions in the storage medium 404 include headroom usage determination instructions 412 to, based on the simulation, determine a respective amount of headroom used by the workload in each storage system of the collection of storage systems.

The machine-readable instructions in the storage medium 404 include storage system selection instructions 414 to select, based on the determined respective amounts of headroom used by the workload in respective storage systems of the collection of storage systems, a storage system from the collection of storage systems on which the storage volume is to be provisioned.

Figure 5:
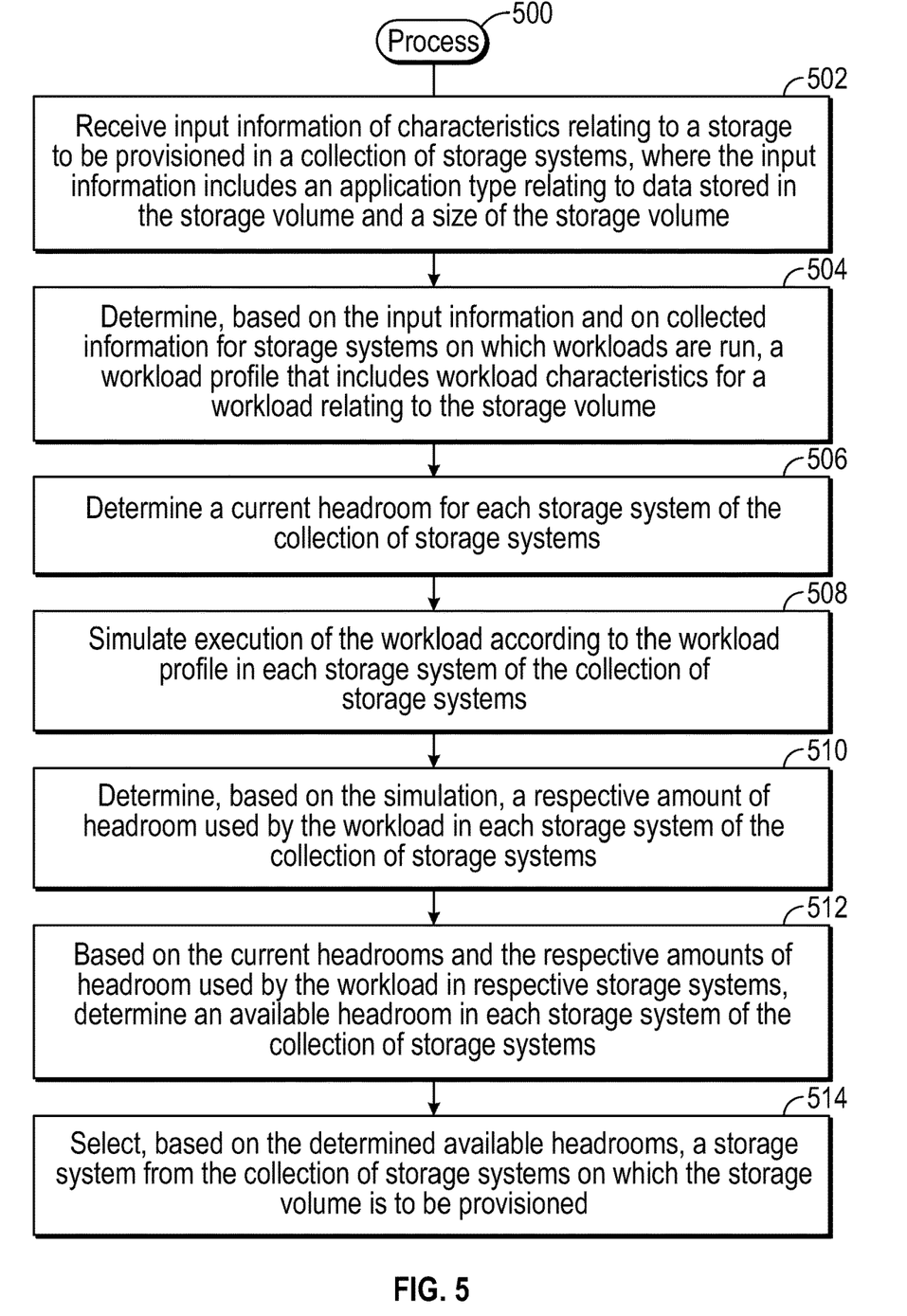
FIG. 5 is a flow diagram of a process according to some examples.

FIG. 5 is a flow diagram of a process 500 according to some examples, which may be performed by the intent-based provisioning system 102.

The process 500 includes receiving (at 502) input information of characteristics relating to a storage volume to be provisioned in a collection of storage systems, where the input information includes an application type relating to data stored in the storage volume and a size of the storage volume.

The process 500 includes determining (at 504), based on the input information and on collected information for storage systems on which workloads are run, a workload profile that includes workload characteristics for a workload relating to the storage volume.

The process 500 includes determining (at 506) a current headroom for each storage system of the collection of storage systems. The current headroom available for each storage system may be derived from the current headroom usage CH_i for each storage system i discussed further above (e.g., 100−CH_i).

The process 500 includes simulating (at 508) execution of the workload according to the workload profile in each storage system of the collection of storage systems.

The process 500 includes determining (at 510), based on the simulation, a respective amount of headroom used by the workload in each storage system of the collection of storage systems.

Based on the current headrooms and the respective amounts of headroom used by the workload in respective storage systems of the collection of storage systems, the process 500 includes determining (at 512) an available headroom in each storage system of the collection of storage systems.

The process 500 includes selecting (at 514), based on the determined available headrooms, a storage system from the collection of storage systems on which the storage volume is to be provisioned.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   receive input information of characteristics relating to a storage volume to be provisioned in a collection of storage systems, wherein the input information comprises an application type relating to data stored in the storage volume, and a size of the storage volume;
   determine, based on the input information of the characteristics relating to the storage volume, a workload profile;
   simulate execution of a workload according to the workload profile in each storage system of the collection of storage systems;
   based on the simulation, determine a respective amount of headroom used by the workload in each respective storage system of the collection of storage systems, wherein the respective amount of headroom used by the workload in the respective storage system is computed based on a quantity of input/output (I/O) operations per unit time of the workload and a ratio between a maximum block size and an I/O size of data in an I/O operation as specified by the workload profile, the maximum block size referring to a maximum size of a block that can be read or written;
select, based on the determined respective amounts of headroom used by the workload in respective storage systems of the collection of storage systems, a storage system from the collection of storage systems on which the storage volume is to be provisioned; and
provision the storage volume on the selected storage system.

2. The non-transitory machine-readable storage medium of claim 1, wherein the input information further specifies a quantity of storage volumes of the application type and the size to be provisioned.

3. The non-transitory machine-readable storage medium of claim 1, wherein the input information further specifies that data reduction technique deduplication is to be applied for the storage volume.

4. The non-transitory machine-readable storage medium of claim 1, wherein the determining of the workload profile is further based on historical workload information collected for storage systems.

5. The non-transitory machine-readable storage medium of claim 4, wherein the determining of the workload profile comprises correlating the application type and the size of the storage volume to respective workload characteristics in the historical workload information, and including the respective workload characteristics in the workload profile.

6. The non-transitory machine-readable storage medium of claim 1, wherein the workload profile further comprises a ratio between read operations and write operations and a rate of input/output operations.

7. The non-transitory machine-readable storage medium of claim 1, wherein the instructions upon execution cause the system to:
determine a current headroom of each storage system of the collection of storage systems,
wherein the selecting of the storage system from the collection of storage systems is further based on the current headroom of each storage system of the collection of storage systems.

8. The non-transitory machine-readable storage medium of claim 7, wherein the instructions upon execution cause the system to:
determine an available headroom of each respective storage system of the collection of storage systems based on the current headroom for the respective storage system and the respective amount of headroom used by the workload on the respective storage system,
wherein the selecting of the storage system from the collection of storage systems is based on the available headroom of each respective storage system of the collection of storage systems.

9. The non-transitory machine-readable storage medium of claim 1, wherein the quantity of I/O operations per unit time comprises a quantity of read operations per unit time, and the I/O size is a read I/O size of read data in a read operation, and
wherein the respective amount of headroom used by the workload in the respective storage system is computed further based on a quantity of write operations per unit time, and a write I/O size of write data in a write operation.

10. The non-transitory machine-readable storage medium of claim 1, wherein the workload profile comprises plural sets of workload characteristics, and wherein the instructions upon execution cause the system to:
simulate execution of plural workloads according to the plural sets of workload characteristics on each storage system of the collection of storage systems.

11. A system comprising:
a processor; and
a non-transitory storage medium storing instructions executable on the processor to:
receive input information of characteristics relating to a storage volume to be provisioned in a collection of storage systems, wherein the input information comprises an application type relating to data stored in the storage volume and a size of the storage volume;
determine, based on the input information and on collected information for storage systems on which workloads are run, a workload profile that includes workload characteristics for a workload relating to the storage volume;
simulate execution of the workload according to the workload profile in each storage system of the collection of storage systems;
based on the simulation, determine a respective amount of headroom used by the workload in each respective storage system of the collection of storage systems, wherein the respective amount of headroom used by the workload in the respective storage system is computed based on a quantity of read operations per unit time, a ratio between a maximum block size and a read I/O size of read data in a read operation, a quantity of write operations per unit time, and a ratio between the maximum block size and a write I/O size of write data in a write operation, the maximum block size referring to a maximum size of a block that can be read or written, wherein the quantities of read and write operations per unit time and the read and write I/O sizes are included in the workload profile;
select, based on the determined respective amounts of headroom used by the workload in respective storage systems of the collection of storage systems, a storage system from the collection of storage systems on which the storage volume is to be provisioned; and
provision the storage volume on the selected storage system.

12. The system of claim 11, wherein the workload profile comprises plural sets of workload characteristics, and wherein the instructions are executable on the processor to:
simulate execution of plural workloads according to the plural sets of workload characteristics on each storage system of the collection of storage systems,
wherein the selecting of the storage system is based on corresponding amounts of headroom used by the plural workloads in corresponding storage systems of the collection of storage systems as determined from the simulation of the execution of the plural workloads.

13. The system of claim 12, wherein the plural sets of workload characteristics correspond to different read/write ratios.

14. The system of claim 11, wherein the respective amount of headroom used by the workload in the respective storage system is computed based on:
the quantity of I/O operations per unit time of the workload, and a ratio between a maximum block size and the I/O size, the maximum block size referring to a maximum size of a block that can be read or written.

15. The system of claim 11, wherein the instructions are executable on the processor to:
- determine a current headroom of each respective storage system of the collection of storage systems; and
- determine an available headroom of each respective storage system of the collection of storage systems based on the current headroom for the respective storage system and the respective amount of headroom used by the workload on the respective storage system,
- wherein the selecting of the storage system from the collection of storage systems is based on the available headroom of each respective storage system of the collection of storage systems.

16. A method of a system comprising a hardware processor, comprising:
- receiving input information of characteristics relating to a storage volume to be provisioned in a collection of storage systems, wherein the input information comprises an application type relating to data stored in the storage volume and a size of the storage volume;
- determining, based on the input information and on collected information for storage systems on which workloads are run, a workload profile that includes workload characteristics for a workload relating to the storage volume;
- determining a respective current amount headroom for each respective storage system of the collection of storage systems;
- simulating execution of the workload according to the workload profile in each storage system of the collection of storage systems;
- based on the simulation, determining a respective amount of headroom used by the workload in each respective storage system of the collection of storage systems, wherein the respective amount of headroom used by the workload in the respective storage system is computed based on a quantity of input/output (I/O) operations per unit time of the workload, and a ratio between a maximum block size and an I/O size of data in an I/O operation, the maximum block size referring to a maximum size of a block that can be read or written, wherein the quantity of I/O operations per unit time and the I/O size are included in the workload profile;
- based on the respective current amounts of headroom and the respective amounts of headroom used by the workload in respective storage systems of the collection of storage systems, determining an available amount of headroom in each storage system of the collection of storage systems;
- selecting, based on the determined available amounts of headroom, a storage system from the collection of storage systems on which the storage volume is to be provisioned; and
- provisioning the storage volume on the selected storage system.

* * * * *